(12) United States Patent
Bievenour et al.

(10) Patent No.: US 7,170,679 B2
(45) Date of Patent: Jan. 30, 2007

(54) OPTICALLY ACTIVE COLOR FILTER

(75) Inventors: Torrey M. Bievenour, Stony Brook, NY (US); Lawrence Lieberman, East Setauket, NY (US)

(73) Assignee: Vision Quest Lighting, Inc., Ronkonkoma, NY (US)

( * ) Notice: Subject to any disclaimer, the term of this patent is extended or adjusted under 35 U.S.C. 154(b) by 0 days.

(21) Appl. No.: 10/664,395

(22) Filed: Sep. 18, 2003

(65) Prior Publication Data

US 2004/0061939 A1 Apr. 1, 2004

Related U.S. Application Data

(60) Provisional application No. 60/411,541, filed on Sep. 18, 2002.

(51) Int. Cl.
*G02B 27/28* (2006.01)

(52) U.S. Cl. .................. 359/498; 362/19; 359/502

(58) Field of Classification Search ............. 359/502, 359/498, 486, 494, 495, 501; 362/19; 349/193, 349/194, 18, 79, 80
See application file for complete search history.

(56) References Cited

U.S. PATENT DOCUMENTS

| | | | | |
|---|---|---|---|---|
| 1,690,602 | A | 11/1928 | Trivell | 352/66 |
| 2,184,138 | A | 12/1939 | Corey | 472/61 |
| 2,263,684 | A | 11/1941 | Ryan | 302/19 |
| 2,493,200 | A | 1/1950 | Land | 359/250 |
| 3,785,721 | A | 1/1974 | Harsch | 349/53 |
| 3,915,553 | A * | 10/1975 | Adams et al. | 349/78 |
| 4,019,808 | A | 4/1977 | Scheffer | 349/97 |
| 4,232,948 | A | 11/1980 | Shanks | 349/78 |
| 4,416,514 | A | 11/1983 | Plummer | 349/80 |
| 4,742,439 | A | 5/1988 | Choate | 362/311 |
| 4,968,120 | A | 11/1990 | Depp et al. | 349/97 |
| 5,442,468 | A * | 8/1995 | Reznik et al. | 349/74 |
| 5,689,317 | A | 11/1997 | Miller | 349/97 |

(Continued)

FOREIGN PATENT DOCUMENTS

WO WO 200150187 A1 * 7/2001
WO WO02082169 A1 * 10/2002

OTHER PUBLICATIONS

B. E. A. Saleh, M. C. Teich, "Fundamentals of Photonics", John Wiley & Sons, New York, 1991, pp. 223-235.*

(Continued)

*Primary Examiner*—Arnel C. Lavarias
(74) *Attorney, Agent, or Firm*—Ostrager Chong Flaherty & Broitman P.C.

(57) ABSTRACT

An optically active color filter for controlling the color of light produced by a light source. The color filter includes an optically active device positioned between a linear polarizer and an adjustable position linear polarizer whose orientation can be controlled mechanically or electrically. In a preferred embodiment, the optically active device contains a liquid optically active substance such as high maltose corn syrup. The optically active color filter may be used for controlling the color of a light source such as a stage light or spotlight and in other applications requiring a device for controlling the color of a light source.

35 Claims, 17 Drawing Sheets

U.S. PATENT DOCUMENTS

| | | | |
|---|---|---|---|
| 5,892,612 A | 4/1999 | Miller et al. | 359/260 |
| 5,969,849 A | 10/1999 | Chen | 359/304 |
| 6,252,638 B1 | 6/2001 | Johnson et al. | 399/5 |
| 6,373,569 B1 | 4/2002 | Herman et al. | 356/364 |

OTHER PUBLICATIONS

F. L. Pedrotti, L. S. Pedrotti, 'Introduction to Optics', Prentice Hall, New Jersey, 1993, pp. 298-319.*

Product Specification Sheet for Vari-Lite VL2C Spot Luminaire, Vari-Lite, The Automated Lighting Company, Dallas, Texas (Apr. 1997).

The Coloram II—Colorchanger User Manual, Wybron Incorporated (Apr. 2001).

Coloram II—The Family, Wybron Inc. website http://wybron.com/Entertainment/Coloram/index.html (copyright 1999 and 2003).

* cited by examiner

OPTICALLY ACTIVE COLOR FILTER

PRIORITY CLAIM

This application claims priority from U.S. Provisional Patent Application No. 60/411,541 filed on Sep. 18, 2002, the disclosures of which are incorporated herein by reference.

FIELD OF INVENTION

This invention generally relates to color filters and, more particularly, to an optically active color filter suitable for use with light sources such as stage lights, spotlights and other similar devices.

BACKGROUND OF INVENTION

Typical light sources (e.g., incandescent, fluorescent lights) produce nearly white light. However, color filter devices for controlling the color of lights used for photography, public performances (e.g., stage performances, concerts, sporting events), film-making, architectural design (e.g., wall wash fixtures, spotlights, accent lighting, outdoor lighting), and other similar applications are well known. The most common type of color filter device are dyed gels of various colors that are placed over a white light source (hereafter, "light source") to create a colored light. In some devices, each gel must be manually placed over the light source and must be manually replaced with another gel if a different light color is required. Other devices comprise different colored gels attached to a rotatable roller located in the path of the light source (e.g., the Coloram II, a color scroller made by Wybron). The roller is rotated to place a desired colored gel in the light path to provide the desired colored light. Unfortunately, the mechanical system used to operate the rollers is expensive and subject to breakdowns. In addition, the movement of the gels can cause the gels to rip or tear. Further, the rotating roller devices are only capable of producing a limited number of different colors because only a limited number of gels are available for positioning in the light path. Furthermore, it takes a significant amount of time to switch between colors. Moreover, a major disadvantage in using gels is that the colors produced by the gels are unsaturated. Further, the gels tend to bleach out after long exposure to the high power light sources used in the foregoing devices.

Prior art devices attempt to solve the foregoing problems but each has a problem in utilization that makes it relatively unattractive to manufacture or use. For example, instead of gels, some devices (e.g., the Vari-lite VL2C™) use vacuum deposited thin film layers of dichroic materials that selectively reflect part of the visible spectrum while passing other parts of the spectrum. The dichroic filters are attached to a wheel that can be rotated to place different color filters in the path of a light source. However, mechanical switching makes these devices slow in switching between colors and prone to mechanical breakdown. In addition, such devices are relatively expensive because of the vacuum deposition process used for producing the dichroic filters. Moreover, such devices are limited to stage lighting or film-making applications. Other devices require complicated and/or expensive mechanisms. See, for example, U.S. Pat. No. 6,252,638 to Johnson et al. and U.S. Pat. No. 5,689,317 to Miller. Accordingly, it is a broad object of the invention to provide a color filter that is relatively inexpensive, easy to manufacture, reliable, and simple to maintain and operate.

SUMMARY OF INVENTION

In the present invention, the foregoing purposes, as well as others that will be apparent, are achieved generally by providing an optically active color filter comprising a linear polarizer, preferably a fixed-position linear polarizer, for polarizing light from an unpolarized light source, an optically active device for rotating the polarized light from the linear polarizer and an adjustable linear polarizer for selecting a desired color from the rotated polarized light coming from the optically active device. In a preferred embodiment of the present invention, the optically active device comprises an optically active liquid such as corn syrup. An advantage of the present invention is that it uses inexpensive components and is relatively easy to manufacture. As such, the present invention provides a cost-effective and economic way of producing and controlling a colored light. Further, the use of a small number of relatively simple components makes the present invention reliable and easy to maintain and operate. Other objects, features and advantages of the present invention will become apparent when the detailed description of the preferred embodiments of the invention are considered in conjunction with the drawings which should be construed in an illustrative and not limiting sense as follows.

DESCRIPTION OF PREFERRED EMBODIMENTS

Figure 1:
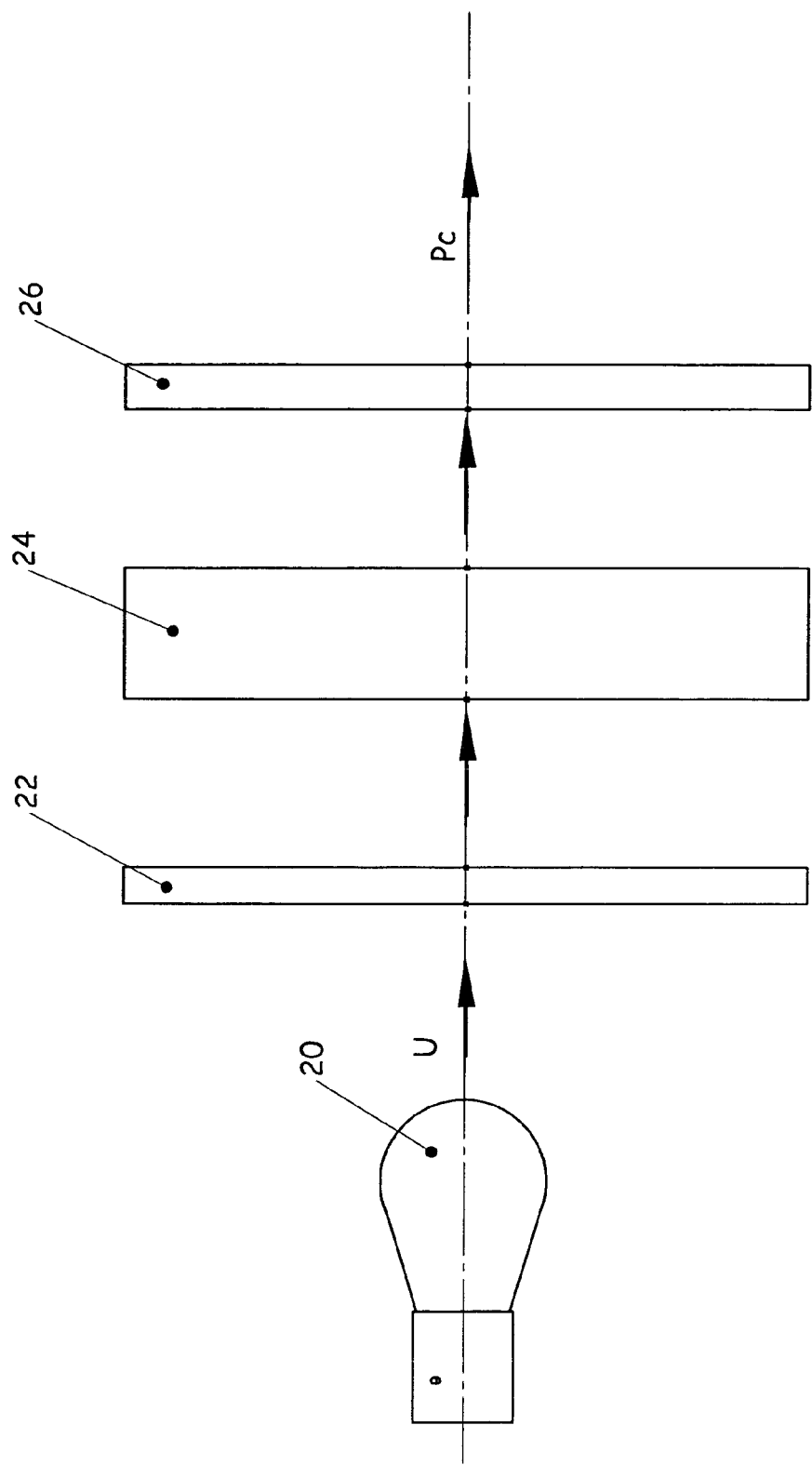
FIG. 1 is a diagram of an optically active color filter embodying features of the present invention.

A diagram of an optically active color filter (hereafter, "color filter") embodying features of the present invention is shown in FIG. 1. The path of light through the color filter is indicated by arrows. As used herein, the term "front" or "forward" refers to the side of the color filter or component thereof through which light exits while the term "rear", "back" or "behind" refers to the side of the color filter or component thereof through which light enters. The color filter generally comprises a neutral, linear polarizer 22, an optically active device 24 and an adjustable, neutral, linear polarizer 26 (hereafter, "adjustable polarizer"). As used herein, the term "adjustable linear polarizer" or "adjustable polarizer" refers to a linear polarizer having a polarization axis whose angle of orientation vis-à-vis the axis of incoming light can be adjusted, e.g., mechanically or electrically. Preferably, the linear polarizer 22 is a fixed-position linear polarizer (hereafter, "fixed polarizer") and the adjustable polarizer 26 is a mechanically rotatable linear polarizer (hereafter, "rotatable polarizer"). In a preferred embodiment, as shown in FIG. 1, the linear polarizer 22 is disposed behind the optically active device 24 and the adjustable polarizer 26 is disposed in front of the optically active device 24. However, as discussed in more detail below, the locations of the linear polarizer 22 and adjustable polarizer 26 may be reversed. In operation, unpolarized white light U from a light source 20 enters the color filter through the linear polarizer 22 and the optically active device 24. By adjusting the orientation of the adjustable polarizer 26, polarized light of the desired color Pc exits the color filter.

As used herein, the term "linear polarizer" refers to an optical device that allows the transmission of radiation of which the electric vector is restricted to one plane resulting in linearly polarized radiation. Linear polarizers suitable for use in the present invention are available from commercial sources, preferably, polarizers with uniform behavior over the visible light spectrum. Examples of suitable linear polarizers are VIKUITI™ Linear Polarizers (Type HN22, HN32, HN38, HN38S, HN42, and HN42HE) from 3M and PROFLUX™ Linear Polarizers from MOXTEK, Inc.

The optically active device 24 comprises an optically active substance (not shown) that may be mounted or contained in a housing or container. The term "optically active substance" as used herein refers to a solid, liquid or gaseous substance (e.g., crystalline active quartz rotators, sucrose solutions, corn syrup) that exhibits the property of "optical activity". Optical activity is the ability to rotate the plane of incident linearly polarized light, with a dependence on wavelength. In a preferred embodiment of the present invention, the optically active device comprises a high maltose corn syrup (e.g., SATIN SWEET® 65% High Maltose Corn Syrup from CARGILL™ Sweeteners).

Figure 13:
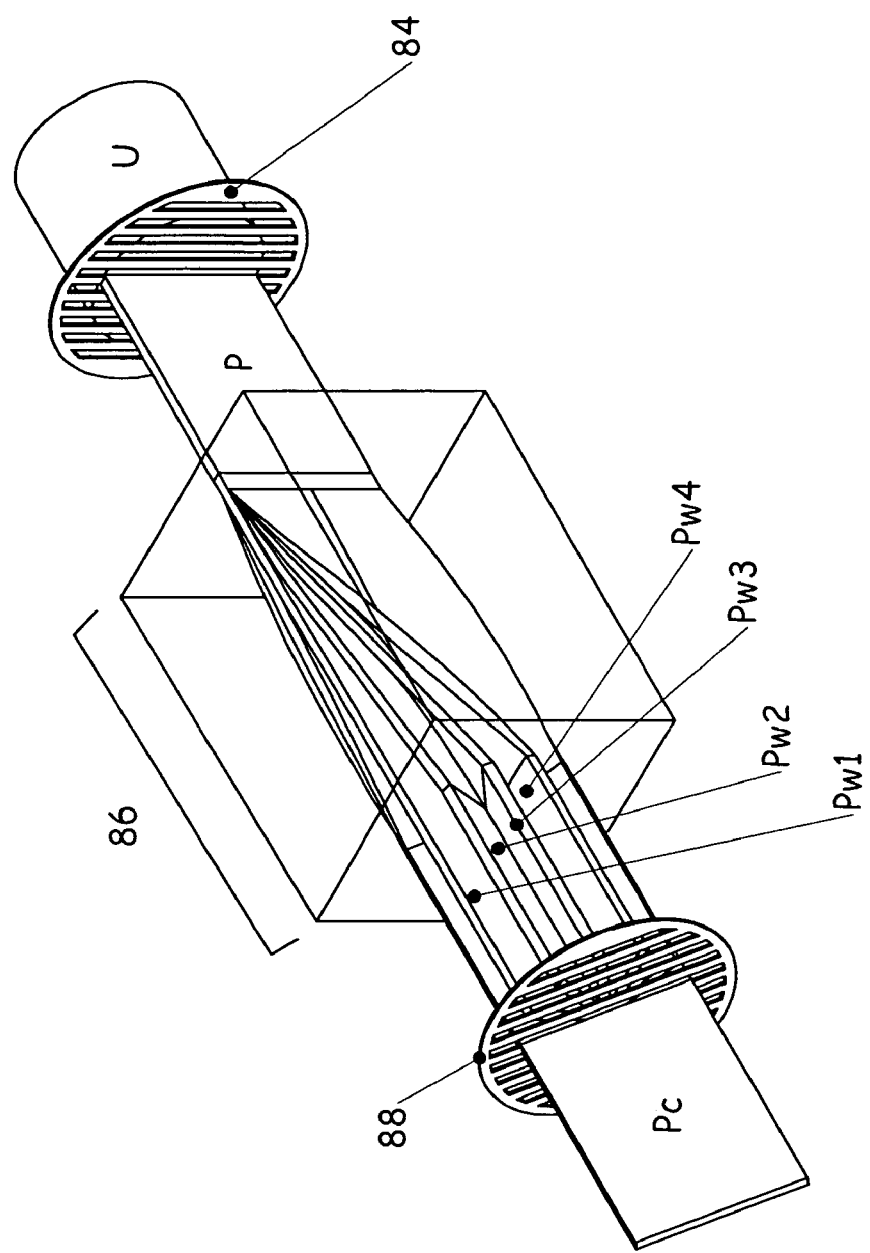
FIG. 13 is a diagram of an optically active color filter embodying features of the present invention showing the path of the light passing through the filter.

In operation (see, FIG. 13) unpolarized white light U from a light source (not shown) enters the rear of the color filter through the linear polarizer 84, resulting in linearly polarized white light P. The linearly polarized white light P then passes through the optically active substance 86. When the linearly polarized white light P passes through the optically active substance 86, the plane of polarization undergoes a rotation. The amount of rotation created as a result of optical activity depends on the wavelength of the incoming light. However, since white light is actually composed of different wavelengths that comprise the visible color spectrum, each wavelength (i.e., $PW_1$ to $PW_n$) comprising a particular color is rotated by a different amount. The specific rotation of plane-polarized light of a specific wavelength through an optically active substance can be determined through the Drude Equation (Eq. 1), stated below.

$$[\alpha]_\lambda = \frac{A}{\lambda^2 - \lambda_C^2} \qquad <\text{Eq. 1}>$$

Where $[\alpha]_\lambda$ is the specific rotation at the wavelength $\lambda$, $\lambda_C$ is the wavelength of the dominating interaction, and A is a constant characteristic of the optically active substance. The units for this measurement are in terms of degrees·cm²/gram. The wavelength-dependent polarized white light (i.e., $PW_1$ to $PW_n$) then passes through the adjustable polarizer 88 whose polarization axis can be rotated around the axis of the incoming light. The wavelength having a polarization plane closest to the orientation of the adjustable polarizer 88 will pass through the adjustable polarizer 88 without attenuation. The greater the angle between the orientation of the adjustable polarizer 88 and the polarization plane of the wavelength, the greater the attenuation of that wavelength. All wavelengths leave the adjustable polarizer 88 with an identical linear polarization and the combination of wavelengths of various attenuations causes the appearance of a single color. Thus, the light leaving the color filter Pc is a plane-polarized selected color.

As previously described above, the positioning of the linear polarizer and the adjustable polarizers can be reversed. Specifically, the adjustable polarizer can be placed behind the optically active device and the linear polarizer placed in front of the optically active device. Thus, by rotating the orientation of the adjustable polarizer by some amount, all of the wavelength-dependent polarized white light rotates by the same amount. Since the orientation of the linear polarizer is constant (i.e., not adjusted), then rotating the different wavelengths (by rotating the adjustable polarizer) changes the wavelength whose orientation is closest to that of the linear polarizer, thus producing a specific color in the same manner of combination of attenuated wavelengths described previously above.

Preferably, the color filter is constructed and adapted to produce, at most, one peak wavelength in the 400 nm to 700 nm range (the visible light spectrum) for any rotation angle of the adjustable polarizer. This is because multiple peaks would result in mixed colors and an inability to generate the familiar visible light range of colors. To optimize the range of the adjustable polarizer to match the range of visible colors, the peak wavelength produced by the color filter should, preferably, stay within the visible light spectrum for at least 90° of rotation of the adjustable polarizer. In addition, some calibration may be needed after the color filter is assembled to make up for inaccuracies in manufacturing. This will insure that different color filters will produce very similar filter profiles. One could use a monochromatic light source, adjust the color filter to the point of greatest extinction, and then set this position as the baseline. Alternatively, one could use a broad-spectrum light source and attempt to match a filter profile by measuring the effect of the filter on the light output.

Figure 2:
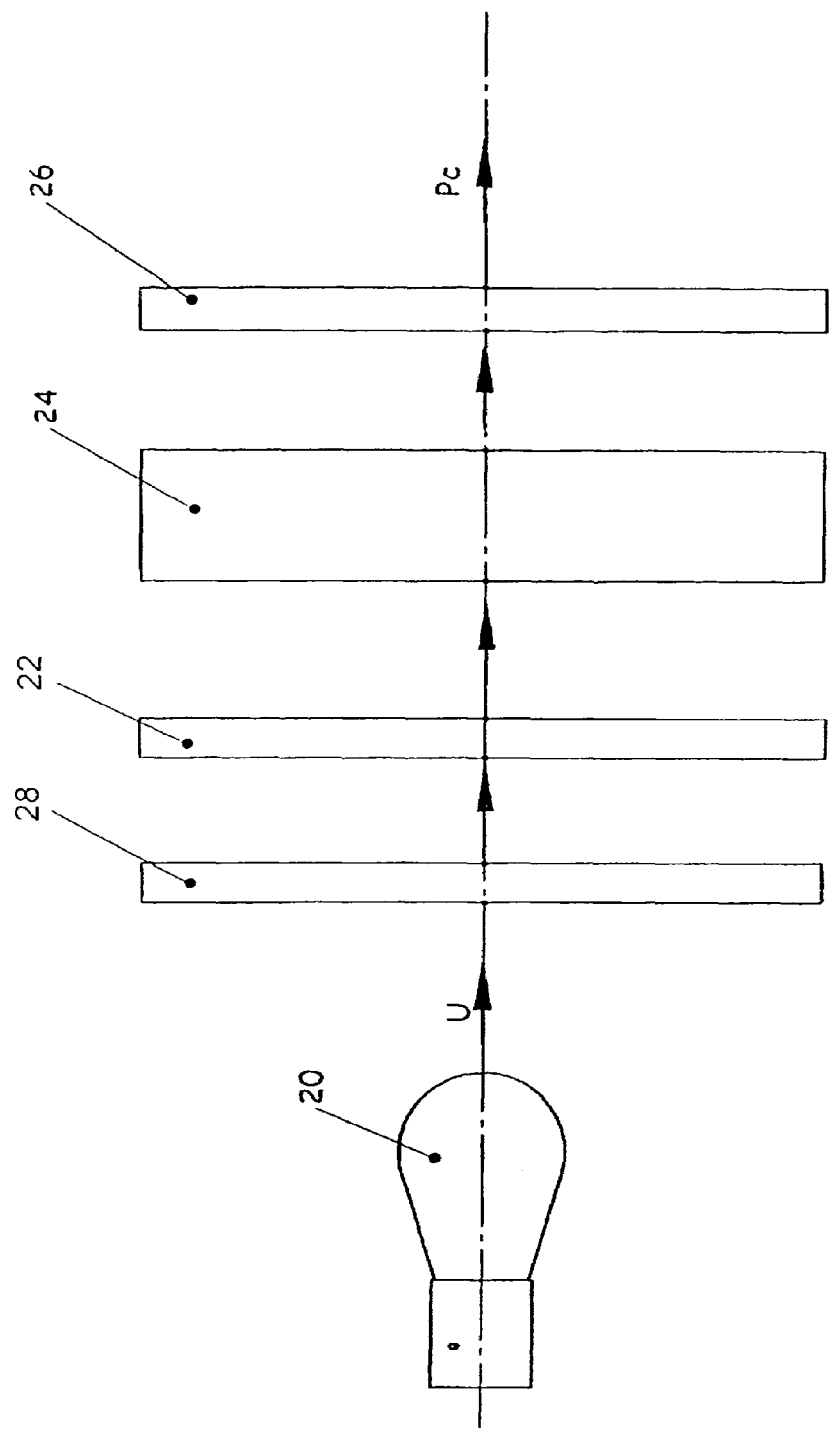
FIG. 2 is a diagram of an optically active color filter embodying features of the present invention that is capable of controlling the intensity of the light produced by the color filter.

In an alternative embodiment of the present invention (see, FIG. 2), a second adjustable polarizer 28 (preferably, a rotatable polarizer) is placed between the light source 20 and the linear polarizer 22. This enables the intensity of the light leaving the color filter to be adjusted. For example, when the orientations of the two polarizers 22, 28 matches, there is maximum intensity and as the orientations of the two polarizers 22, 28 approach 90° the intensity decreases.

Figure 3:
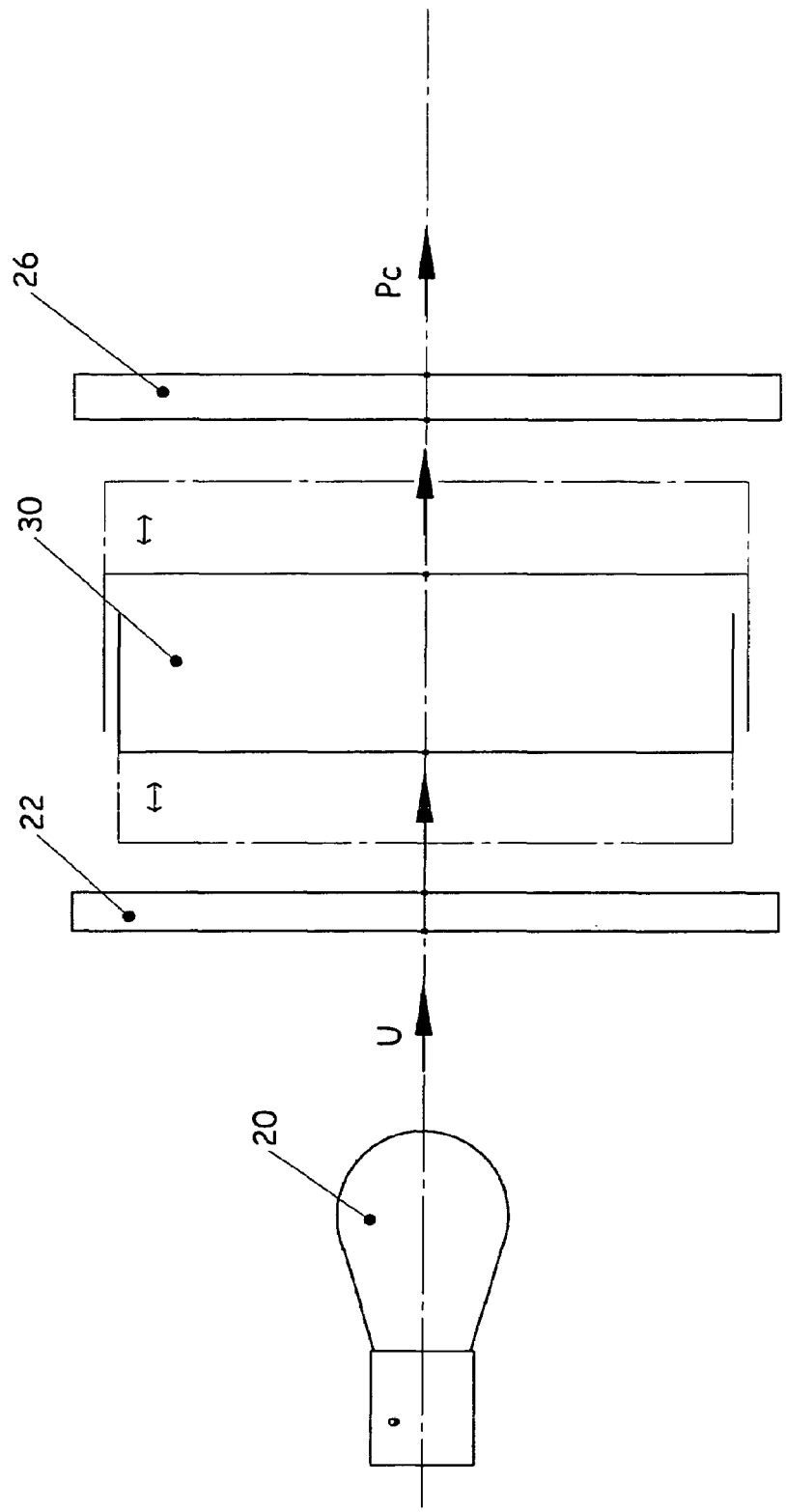
FIG. 3 is a diagram of an optically active color filter embodying features of the present invention having an optically active device whose thickness can be varied.
Figure 4:
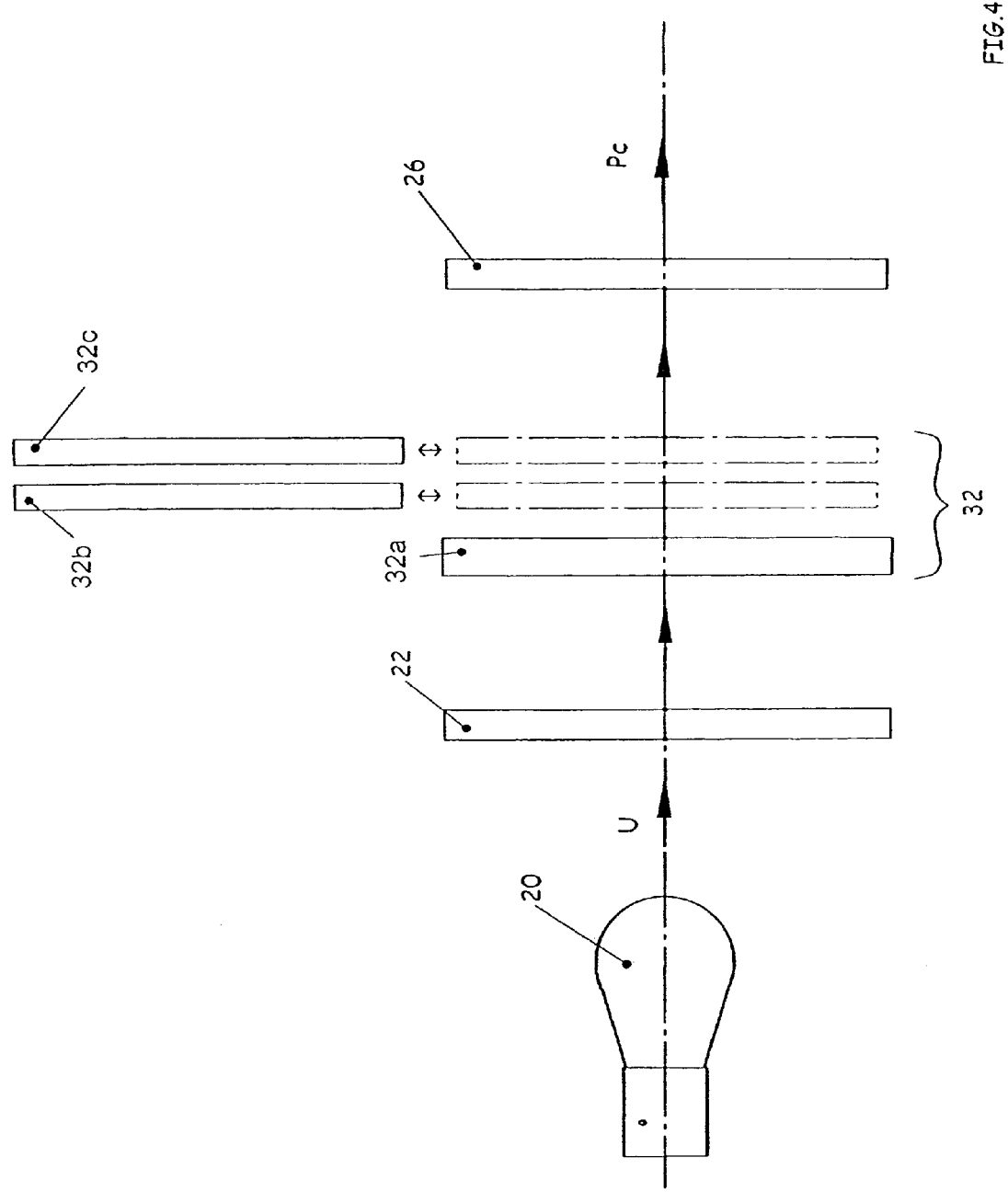
FIG. 4 is a diagram of an optically active color filter embodying features of the present invention having an optically active device comprised of a multiplicity of removable optically active layers.
Figure 8:
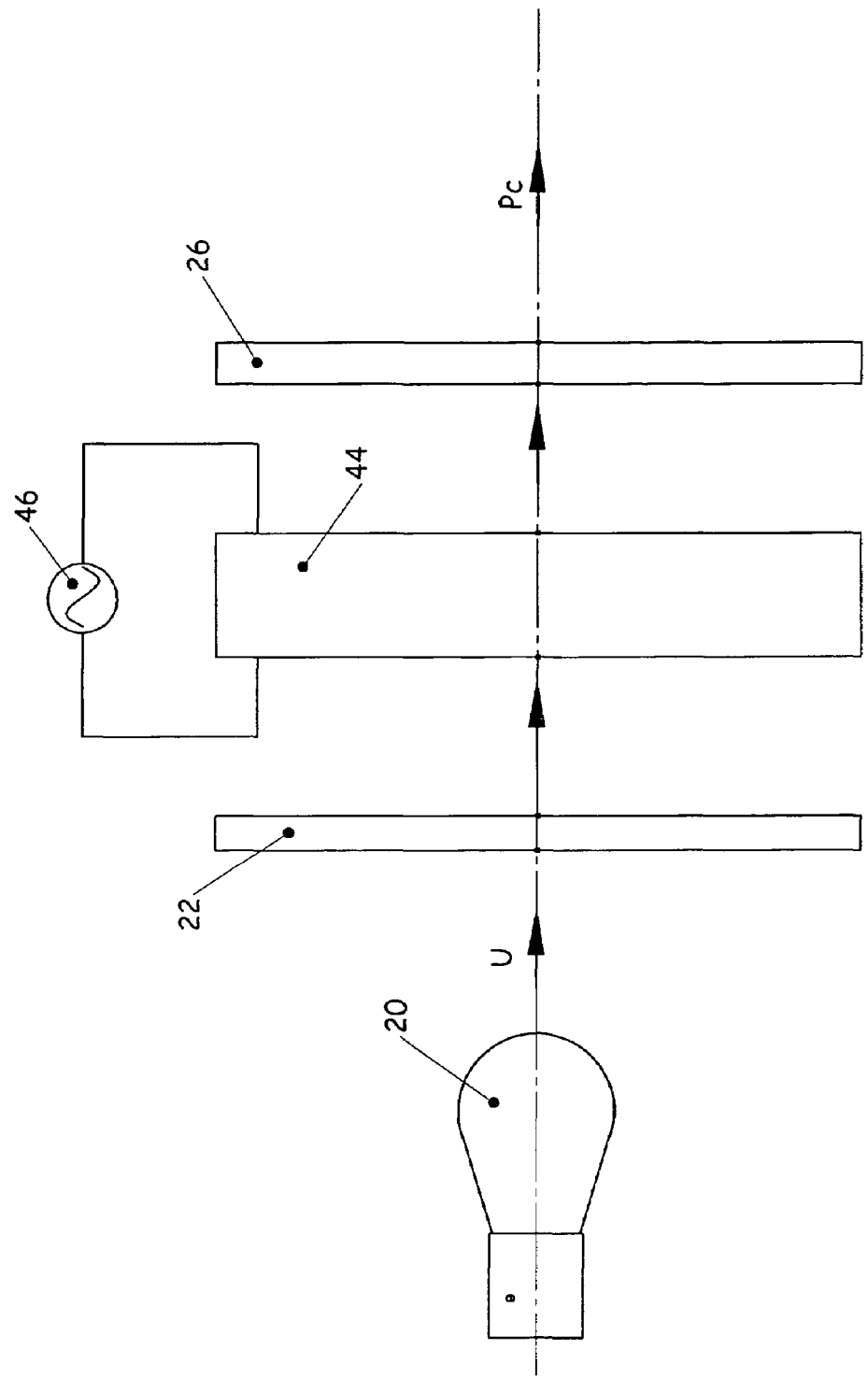
FIG. 8 is a diagram of an optically active color filter embodying features of the present invention having an electrically controlled optically active device.

Referring to FIG. 3, in another embodiment of the present invention the linear distance that light passing through the optically active substance (not shown) must travel (i.e., the "thickness") may be adjustable. This would allow the band profile of transmitted wavelengths of light passing through the color filter to be changed. For example, the optically active substance can be a liquid medium such as corn syrup contained in an adjustable optically active device 30 having a piston or bellows-like construction that allows the thickness of the optically active substance to be increased (in dotted outline) or decreased. Alternatively, (see, FIG. 4) the optically active device 32 may comprise a multiplicity of removable optically active layers 32a, 32b, and 32c, (e.g., sheets, blocks, cartridges or other similar containers holding an optically active substance) so that the thickness can be discretely varied by inserting and/or removing optically active layers. In a further alternative (see, FIG. 8), the degree of optical activity of the optically active substance (not shown) of the optically active device 44 can be altered based on an applied electric or magnetic field 46. For example, the optically active substance can be a crystal whose optical activity is dependent on an applied electric field.

Figure 5:
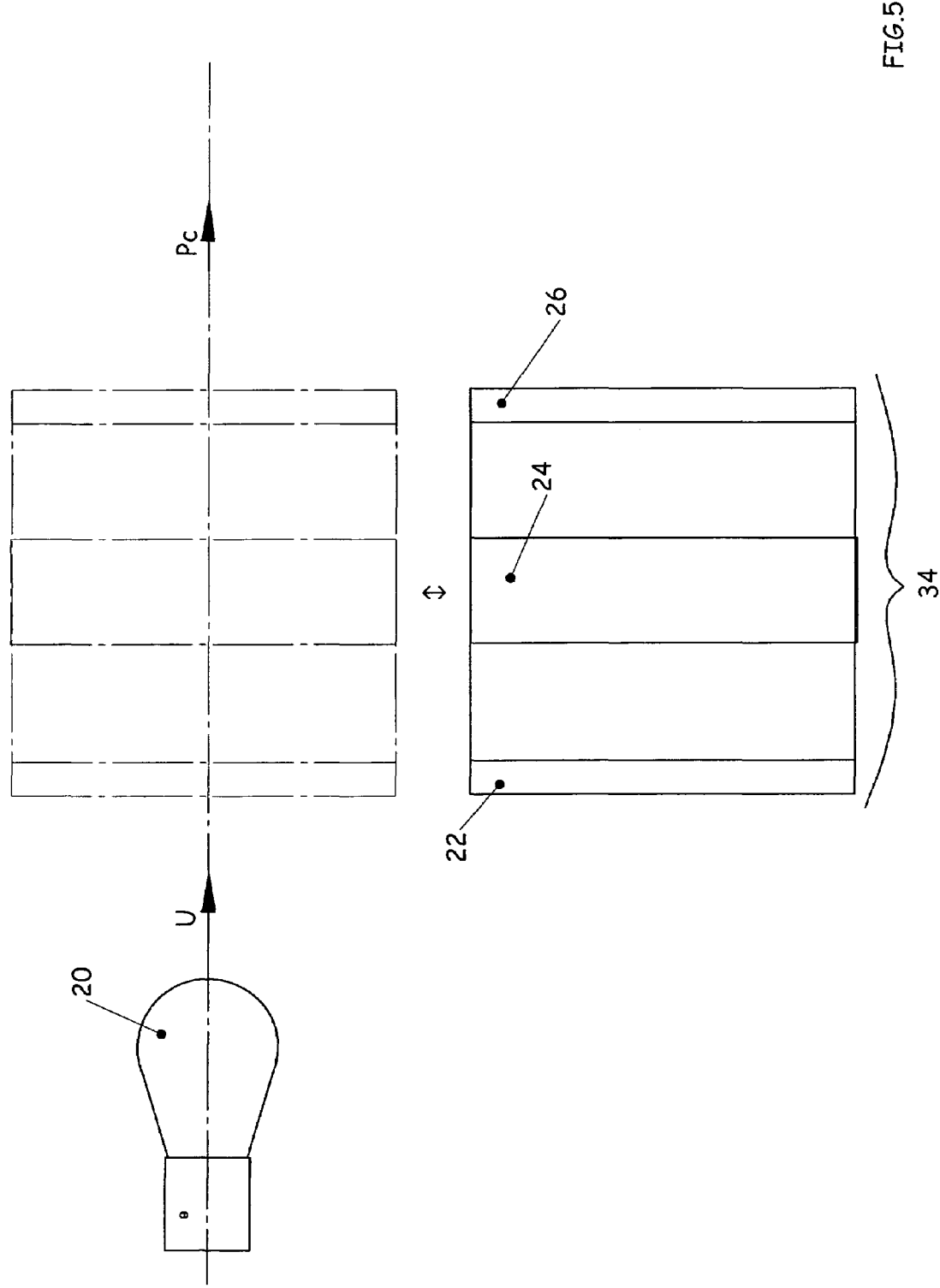
FIG. 5 is a diagram of an optically active color filter embodying features of the present invention that is capable of producing white light.
Figure 6:
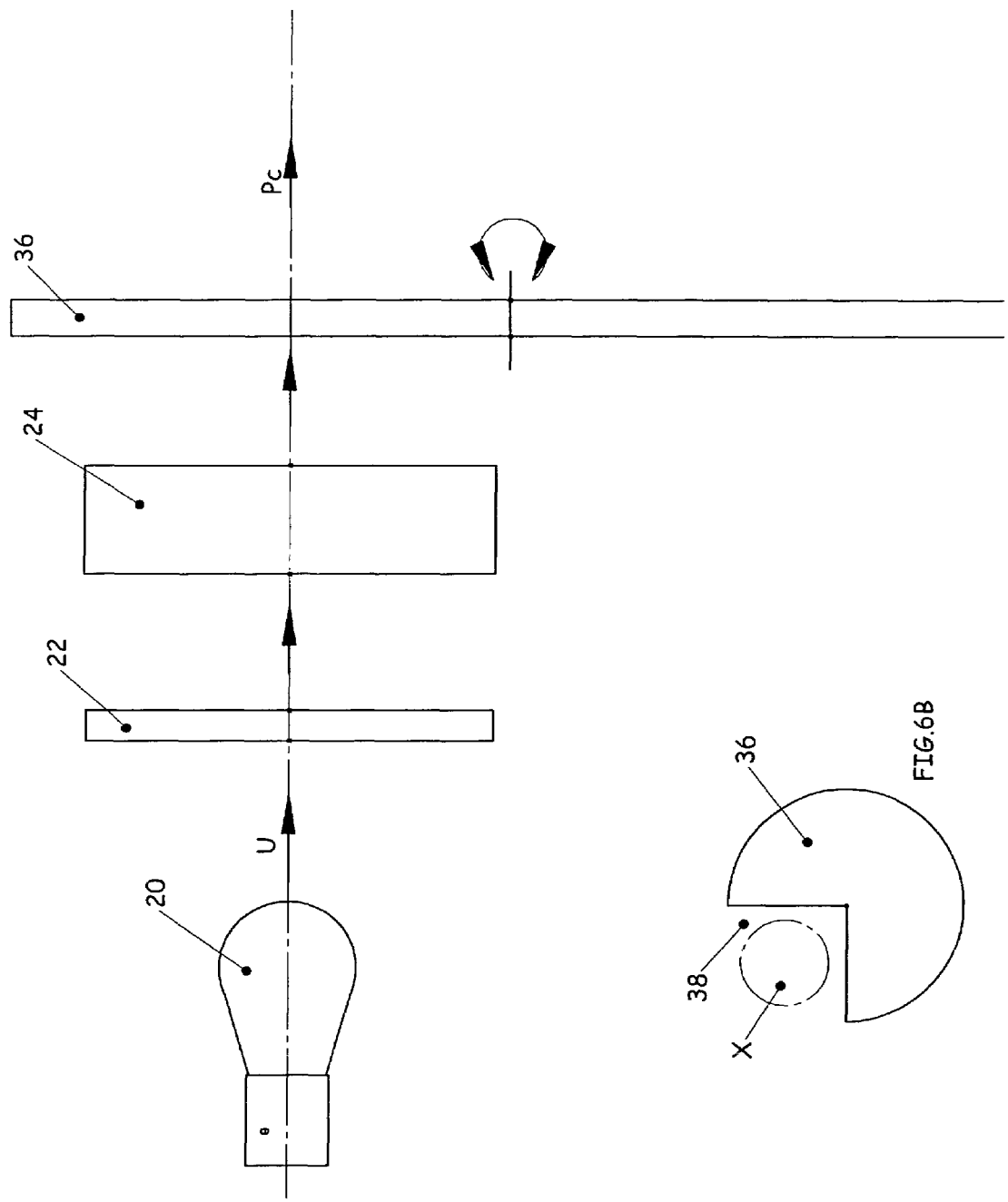
FIG. 6A is a diagram of another embodiment of an optically active color filter embodying features of the present invention that is capable of producing white light.
FIG. 6B is a front plan view of an adjustable polarizer of FIG. 6A.

The removal of any single component of the color filter will result in the transmission of all wavelengths in about equal amounts, thereby producing a white light. Thus, in another embodiment of the present invention (see, FIG. 5), one or more of the elements of the color filter (i.e., the linear polarizer 22, optically active device 24 and adjustable polarizer 26) are encased in a cartridge 34 that can be inserted or removed from the light path. Alternatively, (see, FIGS. 6A and 6B) the adjustable polarizer 36 is a circular-shaped rotatable adjustable polarizer that is positioned so that its center is offset from the light path X. The adjustable polarizer 36 has a radius larger than the light path and one quadrant of the adjustable polarizer 36 is removed to form a cutout 38. Thus, when the cutout 38 is rotated to the light path, the effect is equivalent to removing the adjustable polarizer 36 from the color filter. This enables the color filter to allow white light to pass. In addition, since the adjustable polarizer 36 only provides variation over 180° of rotation, no color possibilities are lost because of the cutout 38.

Figure 7:
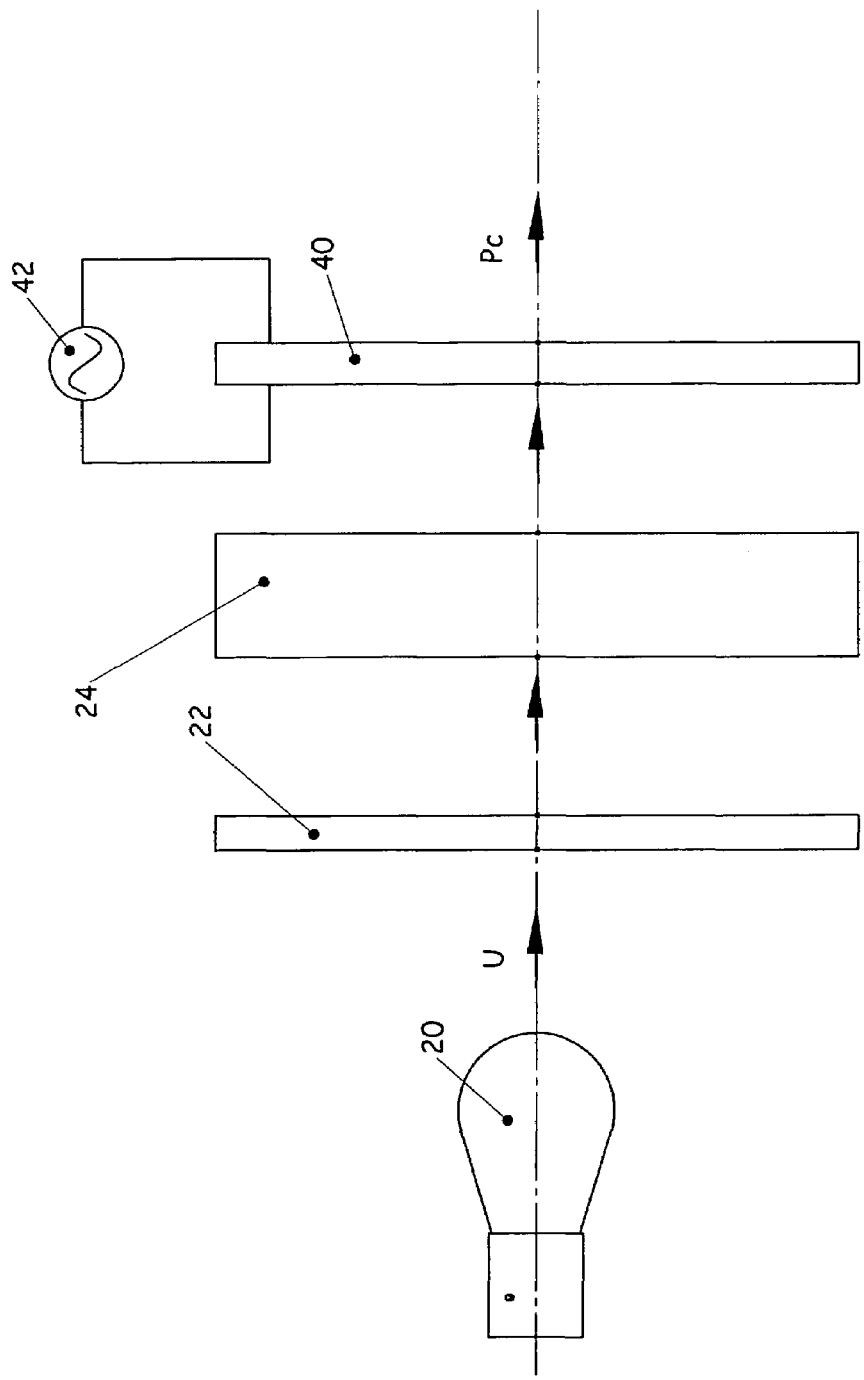
FIG. 7 is a diagram of an optically active color filter embodying features of the present invention having an electrically controlled polarizing assembly.

Referring to FIG. 7, in another embodiment of the present invention, the adjustable polarizer is replaced by a polarizing assembly 40 whose orientation is electrically controlled. This is advantageous because it would enable the color filter to operate without any moving parts. In a preferred embodiment, the polarizing assembly 40 comprises a voltage-controlled liquid crystal panel (not shown) (e.g., ferroelectric and nematic liquid crystal polarization rotators available from Boulder Nonlinear Systems, Inc.) mated with a linear neutral polarizer (not shown). The liquid crystal panel would act as a polarization rotator across the band of visible wavelengths. This liquid crystal panel must be substantially wavelength-independent so that all entering wavelengths are equally rotated. In operation, the various plane-polarized wavelengths from the optically active device 24 would enter the liquid crystal panel and experience a measure of rotation that would be dependent upon the applied voltage 42. The wavelengths would then pass through the linear neutral polarizer. All wavelengths leave the linear neutral polarizer with an identical linear polarization and the combination of wavelengths of various attenuations causes the appearance of a single color. Thus, the light leaving the color filter Pc is a plane-polarized selected color. By varying the applied voltage 42, the amount of rotation of the wavelengths entering the liquid crystal display would change and the net effect would be the same as rotating an adjustable polarizer.

Figure 9:
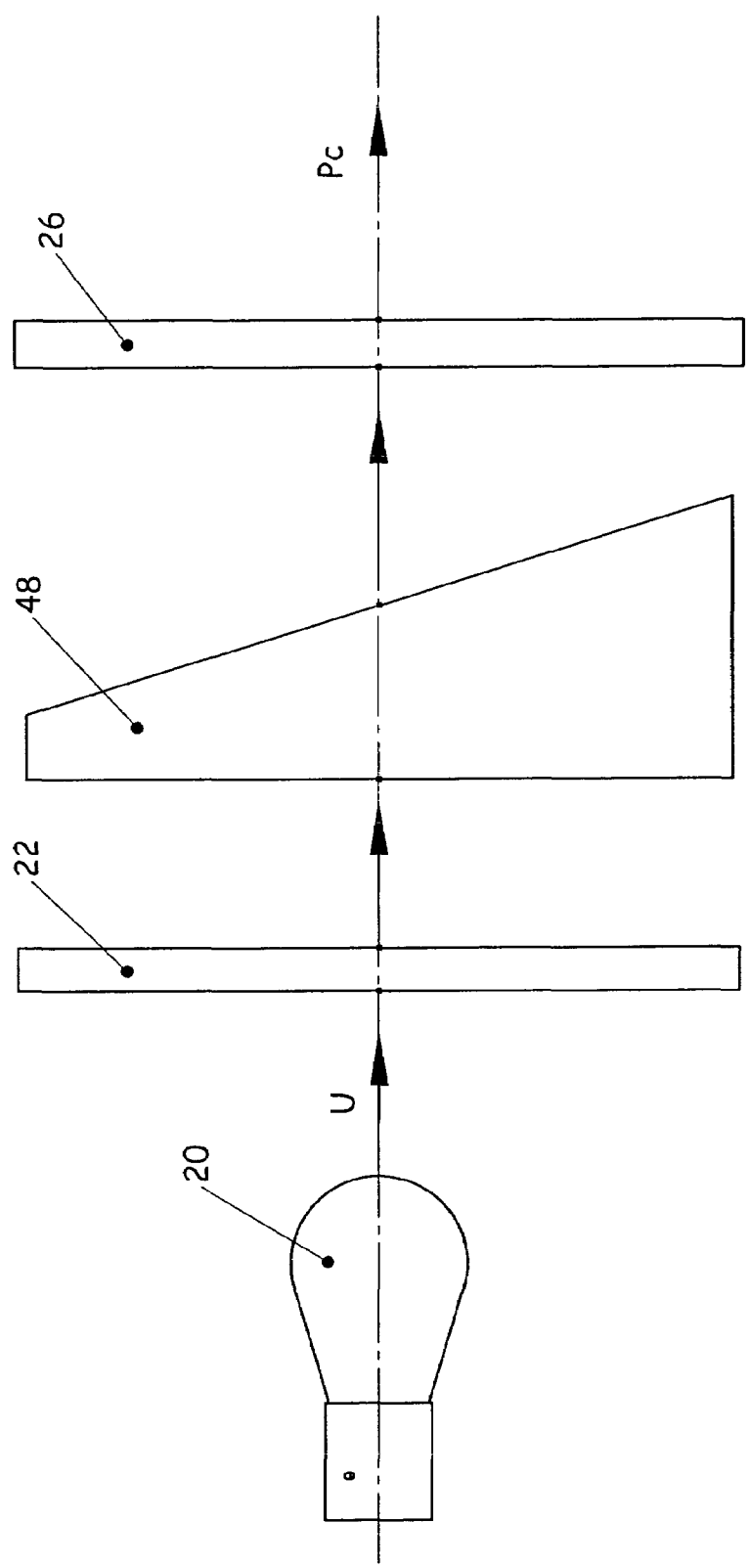
FIG. 9 is a diagram of an optically active color filter embodying features of the present invention having an optically active device of non-uniform thickness.

In a further embodiment of the present invention (see, FIG. 9), the optically active device 48 is not uniform in its thickness. In the embodiment shown in FIG. 9, the optically active device gradually increases in thickness from the top to the bottom of the optically active device 48. However, optically active devices having other shapes that have a non-uniform thickness are within the spirit of the present invention. Due to the non-uniform thickness, different wavelengths will undergo different rotations depending on the thickness of the optically active substance (not shown) that the different wavelengths pass through. The result will be a pattern of colors corresponding to the thickness profile of the optically active device 48. Thus, changing the orientation of the adjustable polarizer 26 would cause the colors to change, but not the pattern of colors. This allows the color filter to produce psychedelic lighting effects. The quality and degree of psychedelic effect produced would be dependent on the design of the particular lighting system (e.g., the color filter's placement within a particular lighting scheme and the actual control system for controlling lighting effects).

In addition to producing psychedelic colors, having an optically active device not uniform in its thickness can be used to allow the color filter to compensate for light beams that may travel at steeper angles (i.e., non-collimated) through the optical activity substance. Specifically, as individual light beams travel through an optically active substance having a uniform profile (i.e., thickness) the greater the angle between the beam and the axis, the greater the actual distance traveled through the profile. This could distort the color produced by the color filter. However, the thickness of the optically active substance can be varied so that all beams from the light source travel an equal distance through the region. That is, if different regions of the optically active substance correspond to different angles, then the thickness in those regions can be varied so that all light beams travel an equal distance thereby ensuring a uniform color.

Figure 10:
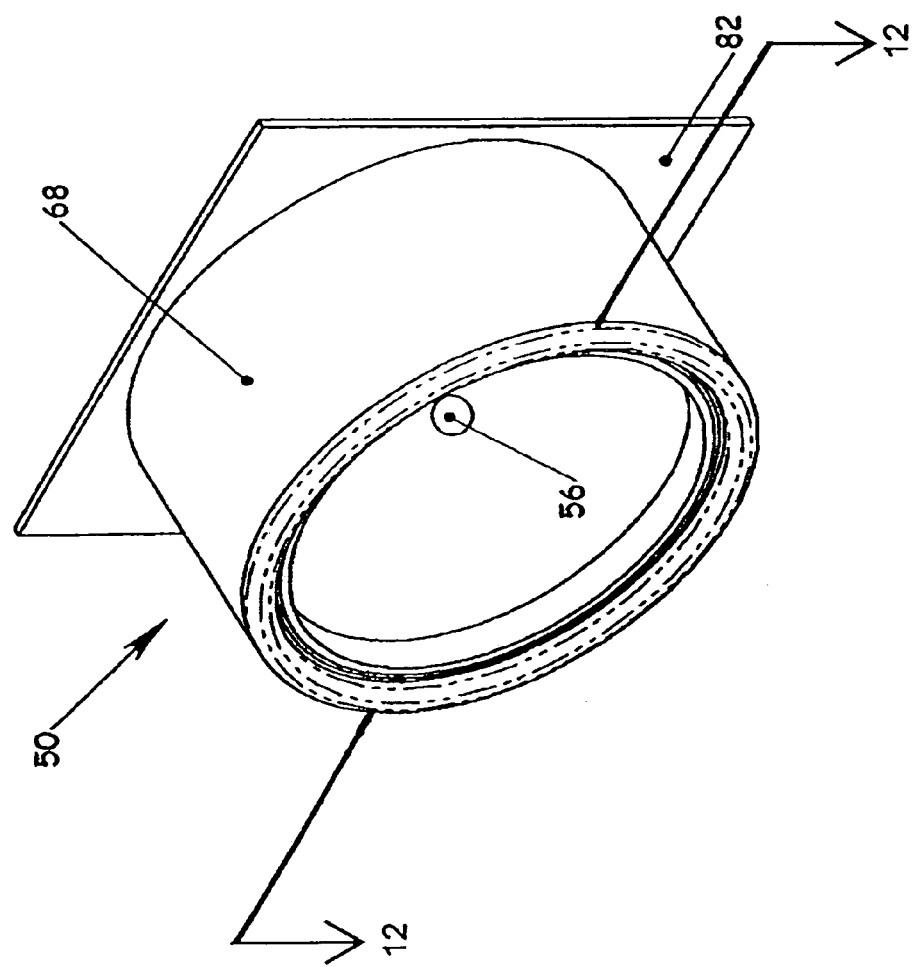
FIG. 10 is a front perspective view of another embodiment of an optically active color filter embodying features of the present invention.
Figure 11:
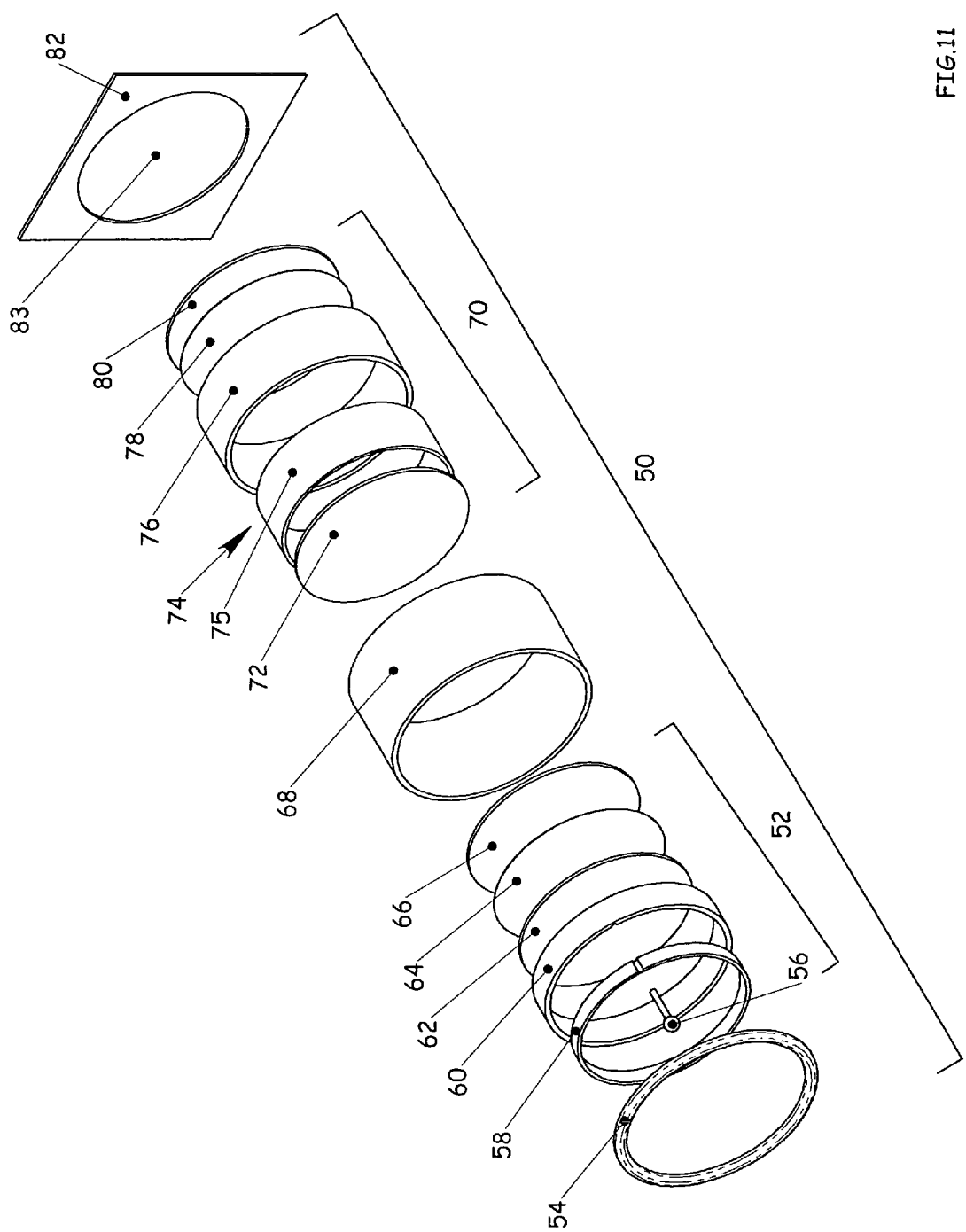
FIG. 11 is an exploded front perspective view of the optically active color filter of FIG. 10.
Figure 12:
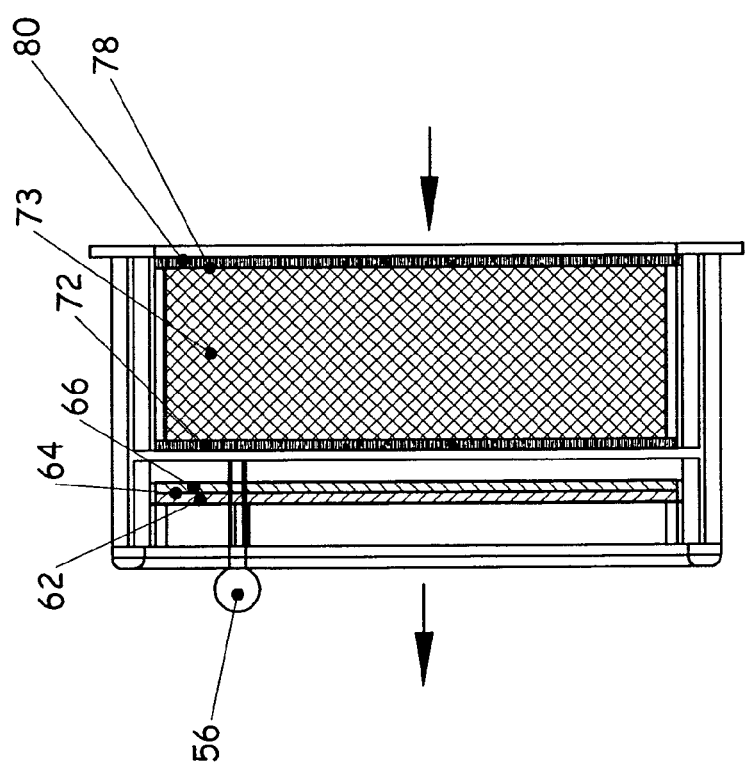
FIG. 12 is a cross-sectional view of the optically active color filter of FIG. 10 taken at the sectioning plane and in the direction indicated by line 12—12 of FIG. 10.
Figure 14:
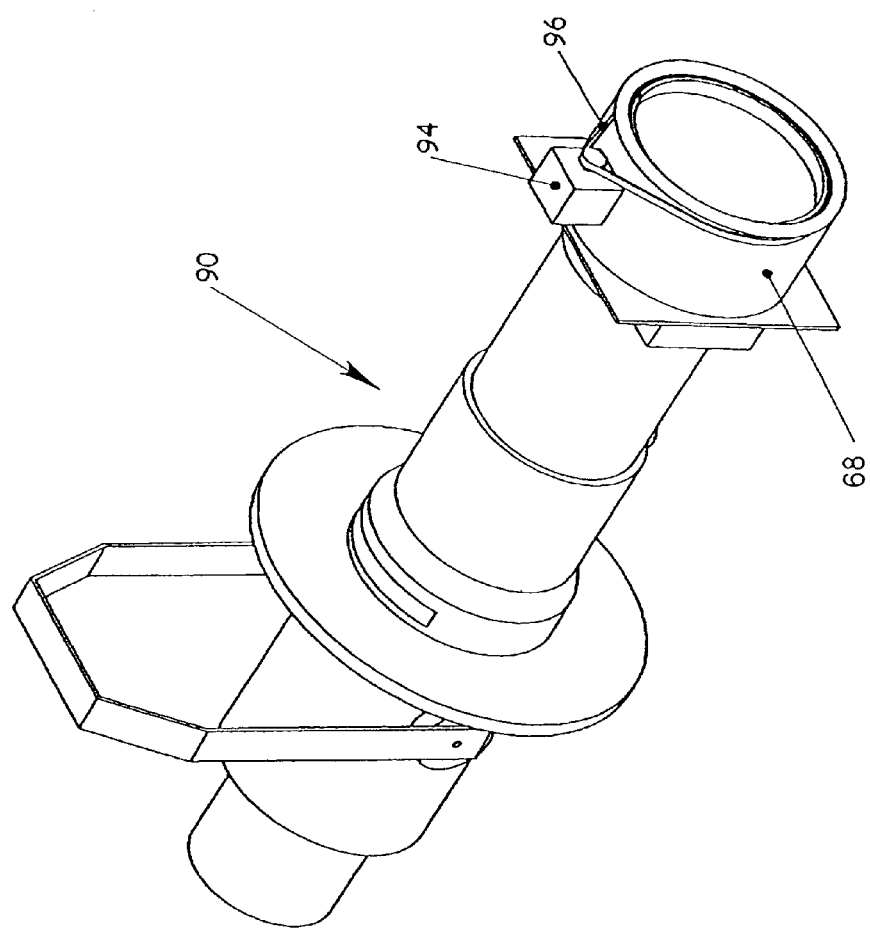
FIG. 14 is a front perspective view of a further embodiment of an optically active color filter embodying features of the present invention mounted on a stage light.

FIGS. 10–12 show a preferred embodiment of a color filter embodying features of the present invention. Referring to FIG. 11, the color filter 50 comprises a generally tubular-shaped rotating polarizer assembly 52 and a generally tubular-shaped color cell assembly 70 contained within a generally tubular-shaped main housing 68. The main housing 68, in turn, is attached to a mounting plate 82. The color filter 50 is made of materials that are commercially available and is assembled using conventional methods. Preferably, the color filter is sized, constructed and adapted to enable the color filter to be used with a spot light 90 (see, FIG. 14) or other similar form of lighting devices used in theatrical productions, film-making or other similar activities.

Referring to FIG. 11, the rotating polarizer assembly 52 has a circular-shaped linear polarizing sheet 64 which functions as the adjustable polarizer. The polarizing sheet 64 is sandwiched between a circular-shaped front cover 62 and rear cover 66. The covers 62, 66 are made of a transparent material, preferably glass. The covers 62, 66 and polarizing sheet 64 are affixed within a tube-shaped rotator housing 60. A rotator ring 58 having a rotation pin 56 is attached to the front edge of the rotator housing 60. The rotator housing 60, rotator ring 58 and rotation pin 56 are made from a resilient material such as acrylic.

The cell assembly 70 comprises an optically active device 74 and a linear polarizing sheet 78 which functions as the linear polarizer. The optically active device 74 comprises a tube shaped container 75 holding an optically active liquid 73 (see, FIG. 12). Preferably, the optically active liquid is high maltose corn syrup. The container 75 is mounted within the front portion of a tube-shaped cell assembly housing 76. The polarizing sheet 78 is mounted within the rear portion of the cell assembly housing 76 directly behind the container 75. A transparent (preferably, glass) front assembly cover 72 and rear assembly cover 80 are affixed over the front and rear edge of the cell assembly housing 76 using a sealant or other similar material to prevent the liquid optically active substance from leaking out. The container 75 and housing 76 may be made from any resilient material, preferably acrylic.

Referring to FIGS. 11 and 12, the rotating polarizer assembly 52 is placed within the front portion of the main housing 68 so that the rotation pin 56 extends from the front end of the main housing. The rotating polarizer assembly 52 is sized, constructed and adapted so that it freely rotates within the main housing 68. The cell assembly 70 is placed within the rear portion of the main housing 68 so that the optically active device 74 is located behind and adjacent to the polarizer assembly 52. The cell assembly 70 is sized, constructed and adapted so that it fits within the main housing 68. The main housing 68 may be fabricated from any resilient material, preferably acrylic.

The rear edge of the main housing 68 is affixed to the mounting plate 82 over a circular opening 83 in the mounting plate. Preferably, the mounting plate 82 is sized, constructed and adapted to allow the mounting plate to be attached to conventional illumination devices such as spotlights or stage lights. See, FIG. 14. The main housing 68 may be held in place to the mounting plate by an adhesive or removable conventional fasteners (not shown) such as screws or pins. A ring-shaped front cap 54 is placed in front of the main housing 68 to prevent the contents of the main housing 68 from slipping out of the main housing. The front cap may be held in place by snap fit or removable conventional fasteners (not shown) such as screws or pins. The front cap 54 and mounting plate 82 may be fabricated from any resilient material, preferably acrylic.

In operation, the color filter 50 may be mounted on the front end of an illumination device such as a spotlight or stage light. Using the rotation pin 56, the rotating polarizer assembly 52 is rotated to produce light having the desired color. In an alternative embodiment shown in FIG. 14, instead of the rotation pin 56, a driving band 96 operated by a motor 94 is used to rotate the rotating polarizer assembly. Other similar alternative means such as gears (not shown) may be used to rotate the rotating polarizer assembly. The color filter could also be built directly into the light (e.g., a spot light) itself rather that attached as an accessory as showing in FIG. 4. Alternatively, the color filter can be split such that either the linear polarizer or adjustable polarizer is placed in an accessory slot of a light (e.g., a spotlight) and the remaining components are placed in front of the light, i.e., between the light source and the accessory slot.

Figure 15:
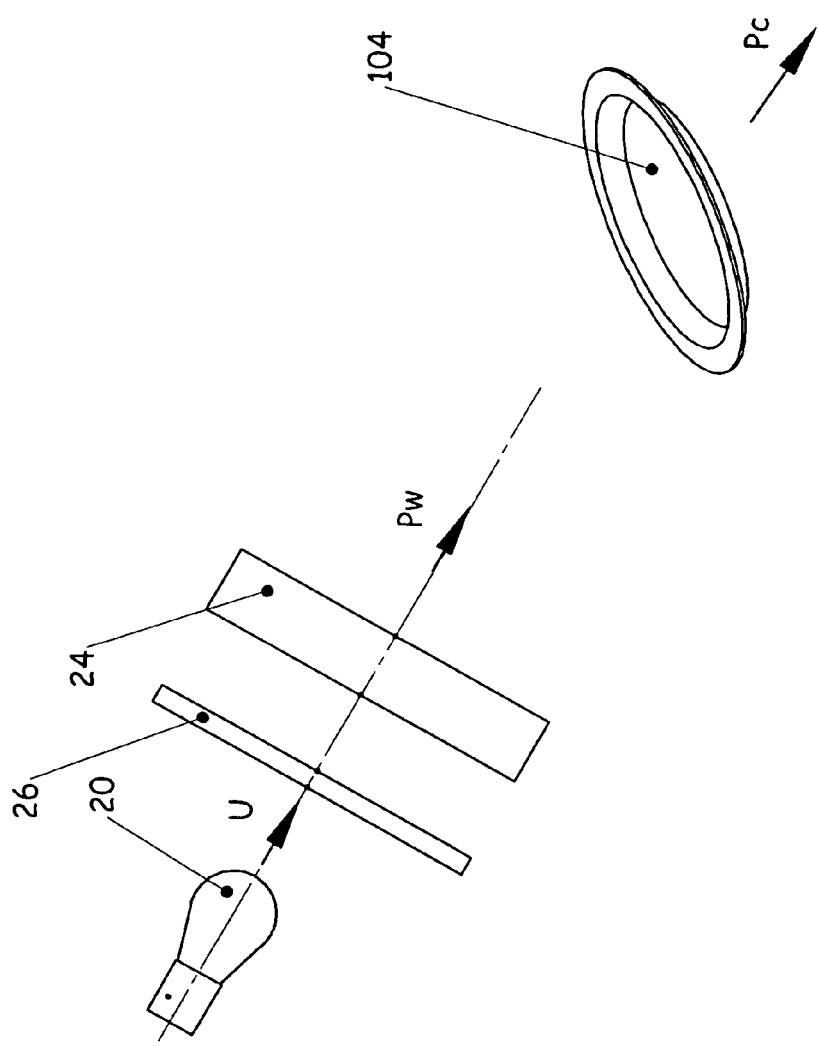
FIG. 15 is a diagram of another embodiment of a color filter embodying features of the present invention.

Another embodiment of the present invention is a lighting effects device useful for producing different colored lighting effects upon an object. As shown in FIG. 15, the adjustable polarizer 26 is placed in behind the optically active device 24 and a target object 104, in this example a clear plate, is coated with a polarizing material (e.g., Vikuiti Linear Polarizers Type HN42 from 3M). When the rotated polarized light Pw from optically active device 24 hits the object, the polarizing material coating the object will produce color Pc. This is because the presence of a polarizing material will block some wavelengths, thereby casting a colored shadow.

Figure 16A:
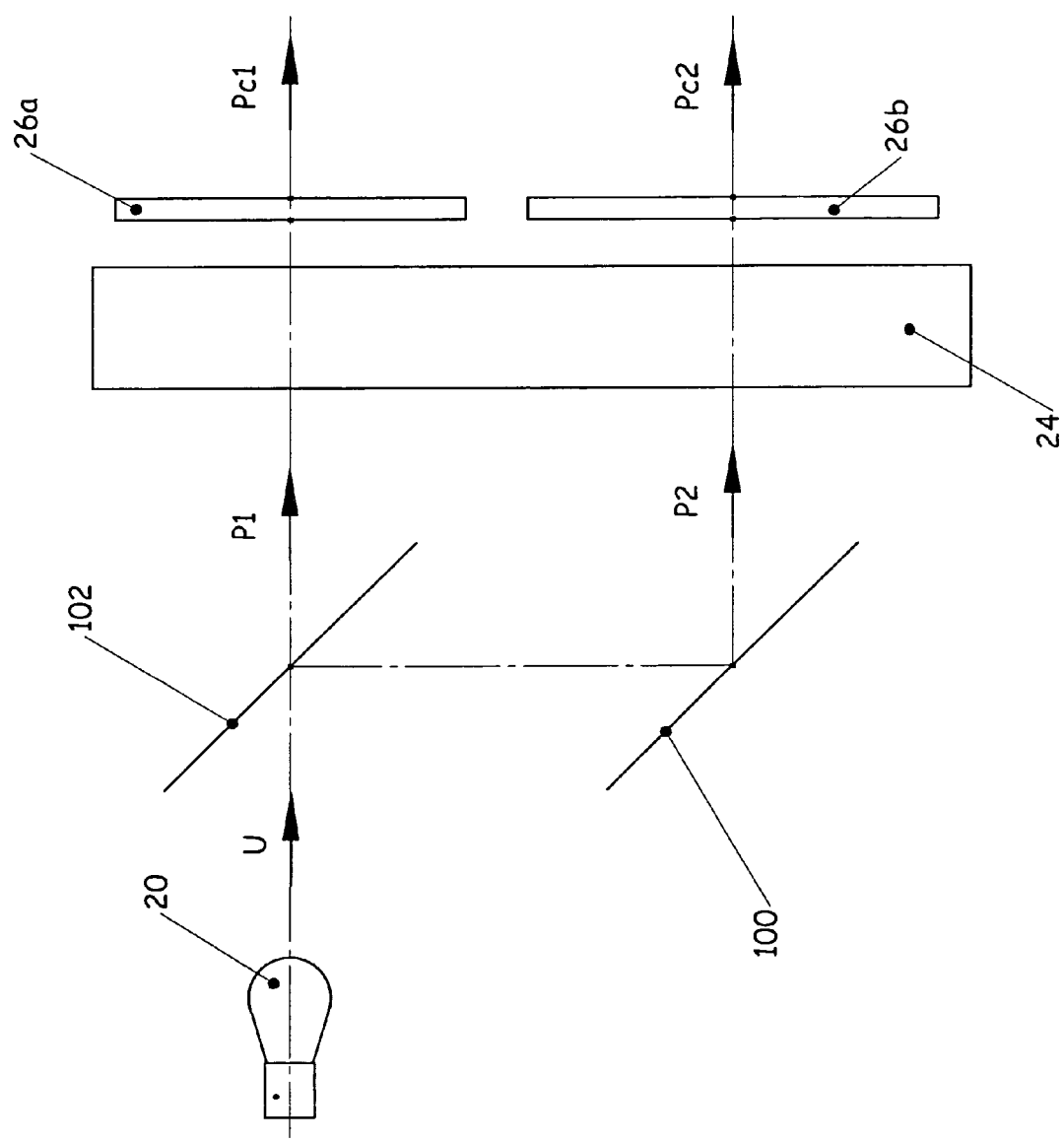
FIG. 16A is a diagram of a further embodiment of a color filter embodying features of the present invention.
Figure 16B:
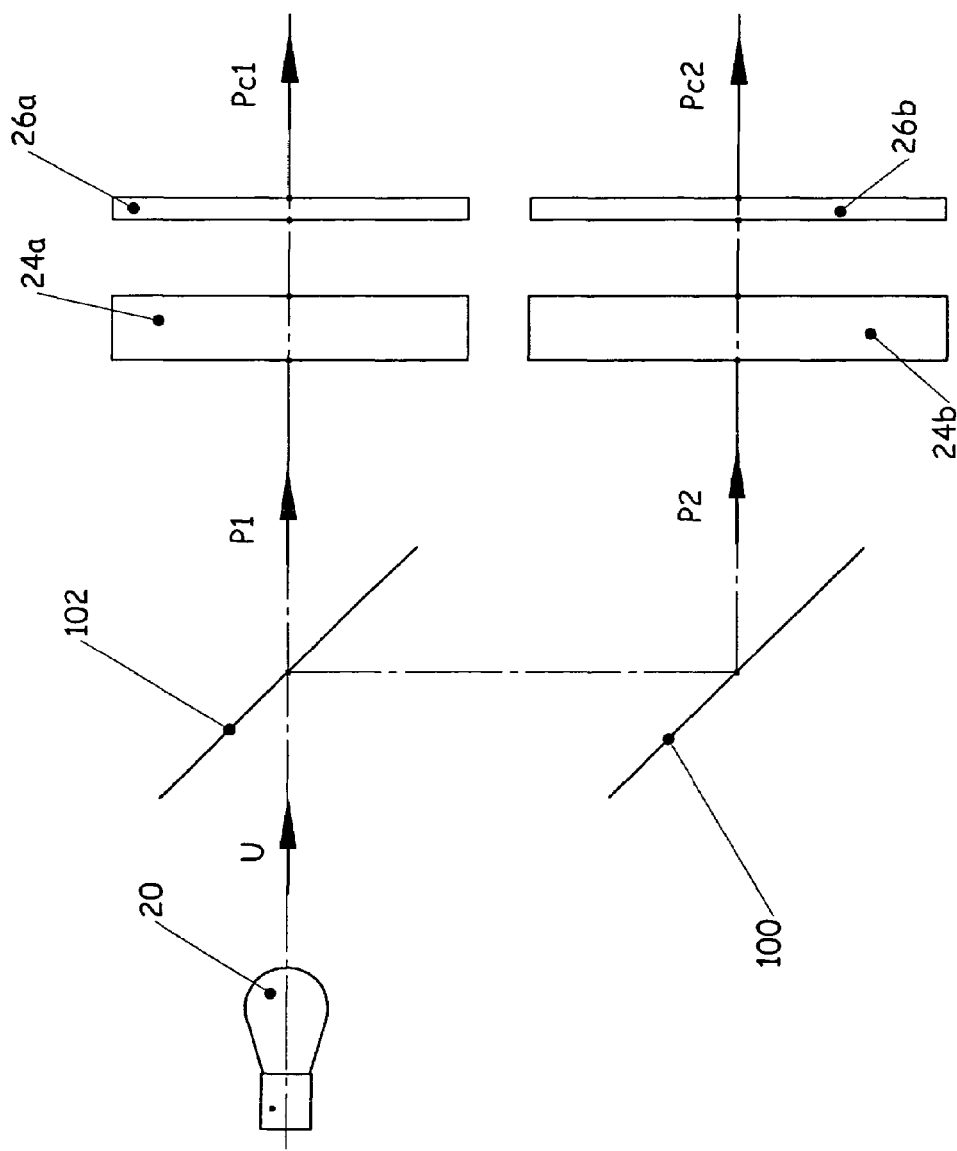
FIG. 16B is another version of the color filter of FIG. 16A.

In a further embodiment of the present invention (see, FIGS. 16A and 16B), instead of a linear polarizer, the color filter uses a linear polarizing beamsplitter 102 (e.g., beam-splitting polarizers available from United Crystals Company) for polarizing and splitting unpolarized white light U from a light source 20 into two orthogonally polarized light beams, P1 and P2. The direction of travel of the first and/or second polarized light P1, P2 after exiting the beamsplitter 102 can be adjusted by conventional methods. In the embodiment shown in FIGS. 16A and 16B, the direction of travel of the second polarized light is adjusted by a mirror 100. However, other suitable devices and methods are within the spirit of the present invention. In the embodiment shown in FIG. 16A, the first and second polarized light P1, P2 passes through the optically active device 24 which rotates both the first and second polarized light P1, P2. Alternatively, (see FIG. 16B) instead of a single optically active device, the color filter can have a first optically active device 24a for rotating the first polarized light P1 and a second optically active device 24b for rotating the second polarized light P2. The rotated first polarized light passes through a first adjustable polarizer 26a to produce a desired first color Pc1 while the rotated second polarized light passes through a second adjustable polarizer 26b to produce a second desired color Pc2. This particular embodiment avoids the problem of losing half of the light through the linear polarizer that absorbs the polarization state that it does not transmit (as opposed to reflecting or redirecting it). If the optically active device is a single uniform assembly (see, FIG. 16A) and the orientations of the first and second adjustable polarizers 26a, 26b are appropriately aligned, then both color beams Pc1, Pc2 will exit with the same color, otherwise, each beam will have a different color. The beams Pc1, Pc2 can be focused on the same point for reinforcement or color mixing applications.

One or more color filters of the present invention may be controlled by a remote control device (i.e., a control device located at a distance from the color filter). The remote control device may be a wired or wireless (e.g., infra-red, radio-frequency) remote control device. The remote control device can control the color filter by adjusting power supplied to the color filter, by sending digital or analog control signals to the color filter or other similar methods for controlling the colors, intensity or other lighting effects produced by the color filter. By way of example, the color filter can be connected to an electronic lighting control device (e.g., a Sunn PLC 3200 control console) that can control the color filter using a suitable lighting protocol (e.g., DMX lighting protocol).

Although the invention has been described with reference to embodiments relating to theatrical and film-making lighting applications, it will be appreciated by one of ordinary skill in the art that numerous modifications are possible in light of the above disclosure. For example, the color filter can be attached to the end of a camera lens. The color filter may also be placed inside a luminaire to produce colored lighting effects. The present invention may also be used to produce colored lighting effects in outdoor lighting displays, signs, decorative lamps and other similar applications. The color filter may also be mounted inside an image projector that is set up so that different images are projected in coincidence with different angles of the adjustable polarizer. This would allow construction of a multi-color image from a single filter system. All such variations and modifications are intended to be within the scope and spirit of the invention.

What is claimed is:

1. An optically active color filter comprising:
a linear polarizer for polarizing light from a light source;
an optically active device for rotating the polarized light from the polarizer, the optically active device comprising an optically active liquid of randomly oriented and positioned molecules and an adjustable thickness container for holding the optically active liquid, wherein the thickness of the optically active device is changed by adjusting the container; and
an adjustable polarizer for selecting a desired color from the rotated polarized light from the optically active device.

2. The color filter of claim 1, wherein the linear polarizer is a fixed-position linear polarizer.

3. The color filter of claim 1, wherein the optically active liquid is corn syrup.

4. The color filter of claim 1, wherein the optically active liquid is a sucrose solution.

5. The color filter of claim 1, wherein the adjustable polarizer is a first rotatable polarizer.

6. The color filter of claim 5 further comprising a second rotatable polarizer disposed between the light source and linear polarizer.

7. The color filter of claim 1, wherein the optically active device comprises a multiplicity of removable layers of optically active liquid.

8. The color filter of claim 1, wherein at least one element thereof is removable.

9. The color filter of claim 1, wherein the thickness of the optically active liquid is not uniform such that all polarized light from the light source travels the same distance through the optically active liquid.

10. The color filter of claim 1, wherein the color filter is controlled by a remote control device.

11. The color filter of claim 10, wherein the control device is an electronic control device.

12. The color filter of claim 10, wherein the remote control device is a wireless remote control device.

13. The color filter of claim 1, wherein the adjustable polarizer comprises an electrically controlled polarizing assembly for selecting a desired color from the rotated polarized light from the optically active device.

14. The color filter of claim 13, wherein the polarizing assembly comprises:
a voltage-controlled liquid crystal panel and
a second linear polarizer.

15. The color filter of claim 1, wherein the adjustable thickness container is a piston.

16. The color filter of claim 1, wherein the adjustable thickness container is a bellows.

17. An optically active color filter comprising:
a linear polarizer for polarizing light from a light source;
an optically active device for rotating the polarized light from the polarizer; and
an adjustable polarizer for selecting a desired color from the rotated polarized light from the optically active device, the adjustable polarizer comprising a circular-shaped rotatable polarizer having a cutout, wherein the rotatable polarizer is disposed offset from a path of the rotated polarized light from the optically active device, and further wherein the radius of the rotatable polarizer extends beyond the light path.

18. An optically active color filter comprising:
a linear polarizing beamsplitter for polarizing and splitting light from a light source into a first polarized light and a second polarized light;
an optically active means for rotating the first and second polarized light from the beamsplitter;
a first adjustable polarizer for selecting a desired first color from the rotated first polarized light from the optically active means; and
a second adjustable polarizer for selecting a desired second color from the rotated second polarized light from the optically active means.

19. The color filter of claim 18, wherein the color filter is controlled by a remote control device.

20. The color filter of claim 18, wherein the optically active means is an optically active device.

21. The color filter of claim 20, wherein the thickness of the optically active device is adjustable.

22. The color filter of claim 18, wherein the optically active means comprises:
a first optically active device for rotating the first polarized light from the beamsplitter; and
a second optically active device for rotating the second polarized light from the beamsplitter.

23. The color filter of claim 22, wherein the thickness of at least one optically active device is adjustable.

24. The color filter of claim 18, wherein the optical activity of the optically active means is electrically controlled.

25. The color filter of claim 18, wherein at least one adjustable polarizer is electrically controlled.

26. The color filter of claim 18, wherein the linear polarizing beamsplitter includes an adjustable polarizer for adjusting the polarizing angle of the light from the light source.

27. A lighting effects device, the device comprising:
an adjustable polarizer for polarizing light from a light source;
an optically active device for rotating the polarized light from the polarizer, the optically active device comprising an optically active liquid of randomly oriented and positioned molecules; and
a polarizing material for producing a desired color from the rotated polarized light from the optically active device,
wherein the optically active device further comprises a multiplicity of removable layers of optically active liquid.

28. The lighting effects device of claim 27, wherein the lighting effects device is controlled by a remote control device.

29. An optically active color filter comprising:
an adjustable polarizer for polarizing and selecting a desired color from a light source;
an optically active device for rotating the polarized light from the adjustable polarizer, the optically active device comprising an optically active liquid of randomly oriented and positioned molecules; and a linear polarizer for polarizing the rotated polarized light, wherein the thickness of the optically active liquid is not uniform such that all polarized light from the light source travels the same distance through the optically active liquid.

30. A method for producing a colored light, the method comprising:
- polarizing light from a light source;
- rotating the polarized light through an optically active liquid of randomly oriented and positioned molecules;
- adjusting the thickness of the optically active liquid; and
- selecting a desired color from the rotated polarized light.

31. The method of claim 30, wherein the selecting step comprises passing the rotated polarized light through an adjustable polarizer.

32. The method of claim 30, wherein the thickness of the optically active liquid is not uniform such that all polarized light from the light source travels the same distance through the optically active liquid.

33. The method of claim 30, wherein the optically active liquid is corn syrup.

34. An optically active color filter comprising:
- a linear polarizer for polarizing light from a light source;
- an optically active device for rotating the polarized light from the polarizer, the optically active device comprising an optically active liquid; and
- an adjustable polarizer for selecting a desired color from the rotated polarized light from the optically active device, wherein the color from the adjustable polarizer has only one peak wavelength in the visible light spectrum and further, wherein the peak wavelength stays in the visible light spectrum for at least 90° of rotation of the adjustable polarizer.

35. An apparatus for projecting colored images, the apparatus comprising:
- an image projector; and
- an optically active color filter mounted inside the image projector, the color filter comprising:
  - a linear polarizer for polarizing light from a light source;
  - an optically active device for rotating the polarized light from the polarizer, the optically active device comprising an optically active liquid of randomly oriented and positioned molecules and an adjustable thickness container for holding the optically active liquid, wherein the thickness of the optically active device is changed by adjusting the container; and
  - an adjustable polarizer for selecting a desired color from the rotated polarized light from the optically active device.

* * * * *